US011577597B2

(12) United States Patent
Hashimoto et al.

(10) Patent No.: US 11,577,597 B2
(45) Date of Patent: Feb. 14, 2023

(54) CONTROL APPARATUS FOR VEHICLE COOLING APPARATUS

(71) Applicant: TOYOTA JIDOSHA KABUSHIKI KAISHA, Toyota (JP)

(72) Inventors: Tatsuya Hashimoto, Okazaki (JP); Yukinori Murakami, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 268 days.

(21) Appl. No.: 16/946,789

(22) Filed: Jul. 7, 2020

(65) Prior Publication Data

US 2021/0008972 A1    Jan. 14, 2021

(30) Foreign Application Priority Data

Jul. 9, 2019 (JP) .............................. JP2019-127990

(51) Int. Cl.
*B60K 6/26* (2007.10)
*B60K 6/28* (2007.10)
*H02K 9/19* (2006.01)
*H02K 11/33* (2016.01)
*H02K 7/00* (2006.01)
*B60K 6/445* (2007.10)

(52) U.S. Cl.
CPC .................. *B60K 6/26* (2013.01); *B60K 6/28* (2013.01); *B60K 6/445* (2013.01); *H02K 7/006* (2013.01); *H02K 9/19* (2013.01); *H02K 11/33* (2016.01); *B60Y 2200/92* (2013.01)

(58) Field of Classification Search
CPC . B60K 6/26; B60K 6/28; H02K 11/33; H02K 7/006; H02K 9/19

USPC ........................................................... 701/22
See application file for complete search history.

(56) References Cited

U.S. PATENT DOCUMENTS 5,251,588 A  * 10/1993 Tsujii ...................... B60L 50/61
                                                      903/917
2019/0092186 A1 * 3/2019 Tominaga ................ B60K 1/00
2019/0225076 A1 * 7/2019 Takeno ..................... H02K 9/19

FOREIGN PATENT DOCUMENTS

| JP | 2010268683 A | * 11/2010 | ......... B60H 1/00257 |
| JP | 2012162132 A | * 8/2012 | |
| JP | 2013-158193 A | 8/2013 | |
| JP | 2014-076717 A | 5/2014 | |
| JP | 2014-136552 A | 7/2014 | |
| JP | 2017-019302 A | 1/2017 | |

(Continued)

*Primary Examiner* — Mahmoud Gimie
(74) *Attorney, Agent, or Firm* — Oblon, McClelland, Maier & Neustadt, L.L.P.

(57) ABSTRACT

A control apparatus for a vehicle cooling apparatus that includes: a PCU cooling unit for cooling a power control unit controlling an electric motor; a T/A cooling unit for cooling a drive-force transmitting apparatus including the electric motor; and a heat exchanger for transferring heat between the PCU cooling unit and the T/A cooling unit. The T/A cooling unit includes a first pump for circulating a refrigerant of the T/A cooling unit, while the PCU cooling unit includes a second pump for circulating a refrigerant of the PCU cooling unit. The control apparatus includes a controlling portion configured to cause the first pump to be driven when a temperature of the power control unit is higher than a threshold temperature value and a temperature of the refrigerant of the PCU cooling unit is higher than a temperature of the refrigerant of the T/A cooling unit.

4 Claims, 4 Drawing Sheets

(56) References Cited

FOREIGN PATENT DOCUMENTS

| | | |
|---|---|---|
| JP | 2017-081228 A | 5/2017 |
| JP | 2017-087801 A | 5/2017 |

\* cited by examiner

CONTROL APPARATUS FOR VEHICLE COOLING APPARATUS

This application claims priority from Japanese Patent Application No. 2019-127990 filed on Jul. 9, 2019, the disclosure of which is herein incorporated by reference in its entirety.

FIELD OF THE INVENTION

The present invention relates to a control apparatus for a cooling apparatus that is to be installed on a vehicle, and more particularly, to an improvement of a cooling efficiency of the cooling apparatus.

BACKGROUND OF THE INVENTION

There is known a cooling apparatus to be installed on a vehicle that includes (i) a drive-force transmitting apparatus including an electric motor and (ii) a power control unit, wherein the cooling apparatus includes a T/A cooling unit for cooling the drive-force transmitting apparatus, a PCU cooling unit for cooling the power control unit and a heat exchanger for transferring heat between the PCU cooling unit and the T/A cooling unit. An example of such a cooling apparatus is disclosed in Patent Document 1. In the cooling apparatus disclosed in the Patent Document 1, the heat generated in the power control unit is utilized to heat a refrigerant (ATF) of the T/A cooling unit through the heat exchanger whereby a viscosity of a lubricant oil is reduced even shortly after start of the vehicle at a low temperature so that a drive loss in a gear mechanism included in the drive-force transmitting apparatus is reduced. Specifically, a temperature (hereinafter referred to as "LLC temperature") of a refrigerant LLC of the PCU cooling unit and a temperature (hereinafter referred to as "ATF temperature") of the refrigerant ATF of the T/A cooling unit are compared with each other, and the heat of the refrigerant LLC is transferred to the refrigerant ATF through the heat exchanger when the LLC temperature is higher than the ATF temperature.

PRIOR ART DOCUMENTS

Patent Documents
  Patent Document 1: JP-2017-87801A
  Patent Document 2: JP-2014-76717A Patent Document 3: JP-2013-158193A
  Patent Document 4: JP-2017-81228A Patent Document 5: JP-2014-136552A

SUMMARY OF THE INVENTION

By the way, due to vehicle electrification in recent years, vehicles are used in diversified manners, so that, for example, there is a case in which a load applied to the power control unit is increased while a load applied to the electric motor is reduced. For example, where the vehicle has a construction that allows an electric power of a storage battery to be supplied to an external device outside the vehicle, when the electric power is being supplied to the external device outside the vehicle, the load applied to the power control unit is increased while the load applied to the electric motor is not be driven is reduced. In this instance, a temperature of the power control unit is increased while a temperature of the electric motor is not substantially increased. In such a case, in the cooling apparatus disclosed in the above-identified Patent Document 1, when the LLC temperature becomes higher than the ATF temperature, a pump is driven to circulate the refrigerant ATF whereby the heat is transferred from the refrigerant LLC to the refrigerant ATF through the heat exchanger. However, the pump is driven even when the temperature of the power control unit is reduced, so that the cooling efficiency could be reduced.

The present invention was made in view of the background art described above. It is therefore an object of the present invention to provide a control apparatus for a vehicle cooling apparatus that includes a PCU cooling unit for cooling a power control unit, a T/A cooling unit for cooling a drive-force transmitting apparatus, and a heat exchanger for transferring heat between the PCU cooling unit and the T/A cooling unit, wherein the control apparatus is capable of improving the cooling efficiency by causing a pump to be efficiency operated. This object is achieved according to the following aspects of the present invention.

According to a first aspect of the invention, there is provided a control apparatus for a cooling apparatus that is to be installed on a vehicle, wherein the vehicle includes (i) a drive-force transmitting apparatus including an electric motor for driving the vehicle, and (ii) a power control unit for controlling the electric motor, wherein the cooling apparatus includes: a PCU cooling unit for cooling the power control unit; a T/A cooling unit for cooling the drive-force transmitting apparatus; and a heat exchanger for transferring heat between the PCU cooling unit and the T/A cooling unit, wherein the T/A cooling unit includes a first pump for circulating a refrigerant of the T/A cooling unit, while the PCU cooling unit includes a second pump for circulating a refrigerant of the PCU cooling unit, and wherein the control apparatus comprises a controlling portion configured to cause the first pump to be driven when a temperature of the power control unit is higher than a threshold temperature value and a temperature of the refrigerant of the PCU cooling unit is higher than a temperature of the refrigerant of the T/A cooling unit. The control apparatus may further comprise a PCU-temperature determining portion and a refrigerant-temperature comparing portion, wherein the PCU-temperature determining portion is configured to determine whether the temperature of the power control unit is higher than the threshold temperature value, and wherein the refrigerant-temperature comparing portion is configured to determine whether the temperature of the refrigerant of the PCU cooling unit is higher than the temperature of the refrigerant of the T/A cooling unit.

According to a second aspect of the invention, in the control apparatus according to the first aspect of the invention, the controlling portion is configured to change a rotational speed of the first pump, depending on the temperature of the refrigerant of the PCU cooling unit and the temperature of the refrigerant of the T/A cooling unit, such that the rotational speed of the first pump is increased with an increase of a difference between the temperature of the refrigerant of the PCU cooling unit and the temperature of the refrigerant of the T/A cooling unit.

According to a third aspect of the invention, in the control apparatus according to the second aspect of the invention, the controlling portion is configured to change a rotational speed of the second pump, depending on the rotational speed of the first pump, such that the rotational speed of the second pump is increased with an increase of the rotational speed of the first pump.

According to a fourth aspect of the invention, in the control apparatus according to the first through third aspects of the invention, the vehicle further includes a storage battery for supplying an electric power to the electric motor, wherein the vehicle has a construction that allows the electric power to be supplied from the storage battery through the power control unit to an exterior of the vehicle.

In the control apparatus according to the first aspect of the invention, when the temperature of the power control unit is higher than the threshold temperature value and the temperature of the refrigerant of the PCU cooling unit is higher than the temperature of the refrigerant of the T/A cooling unit, the first pump is driven for circulating the refrigerant of the T/A cooling unit. In this instance, the heat is transferred between the PCU cooling unit and the T/A cooling unit through the heat exchanger, so that the heat generated in the power control unit is transferred toward the drive-force transmitting apparatus whereby the power control unit is cooled. Further, when the temperature of the power control unit becomes lower than the threshold temperature value, even if the temperature of the refrigerant of the PCU cooling unit is higher than the temperature of the refrigerant of the T/A cooling unit, the first pump is not driven so that it is possible to improve the cooling efficiency by avoiding an unnecessary drive of the pump.

In the control apparatus according to the second aspect of the invention, the rotational speed of the first pump is increased with the increase of the difference between the temperature of the refrigerant of the PCU cooling unit and the temperature of the refrigerant of the T/A cooling unit. Thus, the first pump is efficiently driven whereby the cooling efficiency of the cooling apparatus is improved.

In the control apparatus according to the third aspect of the invention, the rotational speed of the second pump is increased with the increase of the rotational speed of the first pump. Thus, a heat transfer coefficient between the refrigerant of the PCU cooling unit and the heat exchanger is increased with the increase of the rotational speed of the first pump, thereby making it possible to efficiently transfer the heat generated in the power control unit, toward the drive-force transmitting apparatus.

The control apparatus according to the fourth aspect of the invention is applied to the vehicle that has a construction that allows the electric power to be supplied from the storage battery through the power control unit to an exterior of the vehicle, so that the electric power of the storage battery is supplied through the power control unit to an external device during an external power supply. During the external power supply, the temperature of the power control unit is increased whereby the temperature of the power control unit could be higher than the threshold temperature value, and the temperature of the refrigerant of the PCU cooling unit is increased whereby the temperature of the refrigerant of the PCU cooling unit could be higher than the temperature of the refrigerant of the T/A cooling unit. In the control apparatus according to the fourth aspect of the invention, when the temperature of the power control unit becomes higher than the threshold temperature value and the temperature of the refrigerant of the PCU cooling unit becomes higher than the temperature of the refrigerant of the T/A cooling unit, the first pump is driven to cause the heat generated in the power control unit to be transferred through the heat exchanger toward the drive-force transmitting apparatus whereby the power control unit is efficiently cooled.

DETAILED DESCRIPTION OF PREFERRED EMBODIMENT

Hereinafter, a preferred embodiment of the invention will be described in detail with reference to the accompanying drawings. The figures of the drawings are simplified or deformed as needed, and each portion is not necessarily precisely depicted in terms of dimension ratio, shape, etc.

EMBODIMENT

Figure 1:
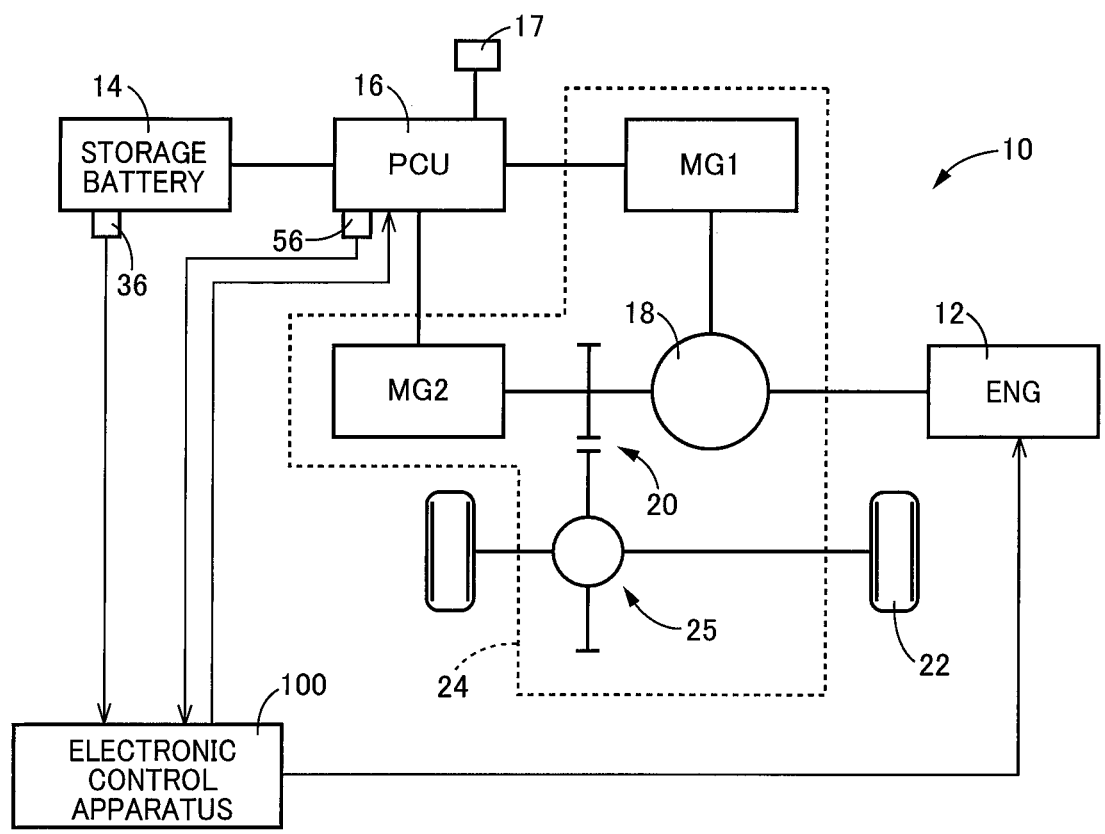
FIG. 1 is a view schematically showing construction of a vehicle on which a cooling apparatus is to be installed, wherein the present invention is applied to the cooling apparatus.

FIG. 1 is a view schematically showing construction of a vehicle 10 on which a cooling apparatus 80 is to be installed, wherein the present invention is applied to the cooling apparatus 80. The vehicle 10 is a hybrid vehicle in which a drive force is to be outputted from at least one of an engine 12 and a second electric motor MG2 that is included in a drive-force transmitting apparatus 24. The vehicle 10 includes, in addition to the above-described engine 12 and drive-force transmitting apparatus 24, a storage battery 14, a power control unit 16 (hereinafter referred to as "PCU 16"), drive wheels 22 and an electronic control apparatus 100. The drive-force transmitting apparatus 24 further includes a first electric motor MG1 in addition to the second electric motor MG2.

The engine 12 is constituted by, for example, an internal combustion engine such as a gasoline engine or a diesel engine.

The storage battery 14 is, for example, a chargeable/dischargeable secondary battery such as a lithium-ion battery pack and a nickel-metal hydride battery pack. The storage battery 14 is configured to store therein an electric power generated by the first electric motor MG1 or second electric motor MG2, by receiving the electric power from the first electric motor MG1 or second electric motor MG2 via the PCU 16, and is configured to supply, to the first electric motor MG1 or second electric motor MG2 via the PCU 16, the electric power for driving the first electric motor MG1 or second electric motor MG2. Further, while being stopped, the vehicle 10 is capable of performing an external power supply by which the electric power is to be supplied from the storage battery 14 through the PCU 16 to an exterior of the vehicle 10. The external power supply is interpreted to mean a supply (discharge) of the electric power of the storage battery 14 toward the exterior of the vehicle 10 through an external power-supply portion. In the present embodiment, the electric power stored in the storage battery 14 is suppliable to an external device (not shown)

outside the vehicle 10 through the CPU 16 and an electric cable that is connected to the external power-supply portion in the form of a connector 17 (e.g., outlet).

The PCU 16 is configured to convert an AC power generated by the first electric motor MG1 or the second electric motor MG2, into a DC power, and then to supply the DC power to the storage battery 14, so as to cause the storage battery 14 to store therein the DC power. Further, the PCU 16 is configured to convert the DC power supplied from the storage battery 14, into the AC power, and then to supply the AC power to the first electric motor MG1 or the second electric motor MG2, so as to drive the first electric motor MG1 or the second electric motor MG2. That is, the PCU 16 is configured to control an operation state of each of the first and second electric motors MG1, MG2. When the external power supply is performed with the vehicle 10 is being stopped, the DC power is supplied from the storage battery 14 to the PCU 16, and the PCU 16 converts the DC power into the AC power, as needed, so that the AC power is supplied to the external device such as an electric device in a user's house. When the external power supply is thus performed, the storage battery 14 and the PCU 16 are heated.

The drive-force transmitting apparatus 24 is a transaxle which includes, in addition to the first and second electric motors MG1, MG2, a drive-force distributing mechanism 18, a speed reducer 20 and a differential device 25, and which is configured to transmit a drive force transmitted from the engine 12 and/or a drive force transmitted from the second electric motor MG2, to the drive wheels 22.

The drive-force distributing mechanism 18 is constituted by a planetary gear device or devices, and is configured to distribute the drive force of the engine 12 to the drive wheels 22 and the first electric motor MG1. Each of the first and second electric motors MG1, MG2 is a so-called motor generator having both a motor function and a generator function. The first electric motor MG1, which serves as a differential electric motor for controlling a differential state of the drive-force distributing mechanism 18, has at least the generator function for generating a reaction force. The second electric motor MG2, which is connected to the drive wheels 22 in a drive-force transmittable manner, has the motor function for serving as an electric motor for outputting the drive force by which the vehicle 10 is to be driven and also the generator function (regenerative function) for converting a kinetic energy of the vehicle 10 into an electric power. It is noted that the second electric motor MG2 corresponds to "electric motor (for driving the vehicle)" recited in the appended claims.

The electronic control apparatus 100, which is referred also to as "ECU", includes a microcomputer incorporating a CPU, a RAM, a ROM and an input-output interface. The CPU performs control operations to control various devices of the vehicle 10, by processing various input signals, according to control programs stored in the ROM, while utilizing a temporary data storage function of the RAM. It is noted that electronic control apparatus 100 correspond to "control apparatus" recited in the appended claims.

The electronic control apparatus 100 is configured to receive an output signal indicative of a storage battery temperature Tbat (° C.) as a temperature of the storage battery 14, which is detected by a storage-battery temperature sensor 36, and an output signal indicative of a PCU temperature Tpcu (° C.) as a temperature of the PCU 16, which is detected by a PCU temperature sensor 56. Further, the electronic control apparatus 100 is configured to receive a signal indicative of a charged state value (charged capacity value) SOC [%] as a value representing a charged state of the storage battery 14. The electronic control apparatus 100 is configured to output control command signals that are supplied to the engine 12 and the PCU 16, so as execute a control operation for controlling the engine 12, a control operation for controlling each of the first and second electric motors MG1, MG2 through the PCU 16 and a control operation for controlling the external power supply by which the electric power is to be supplied from the storage battery 14 through the PCU 16 to the exterior of the vehicle 10.

Figure 2:
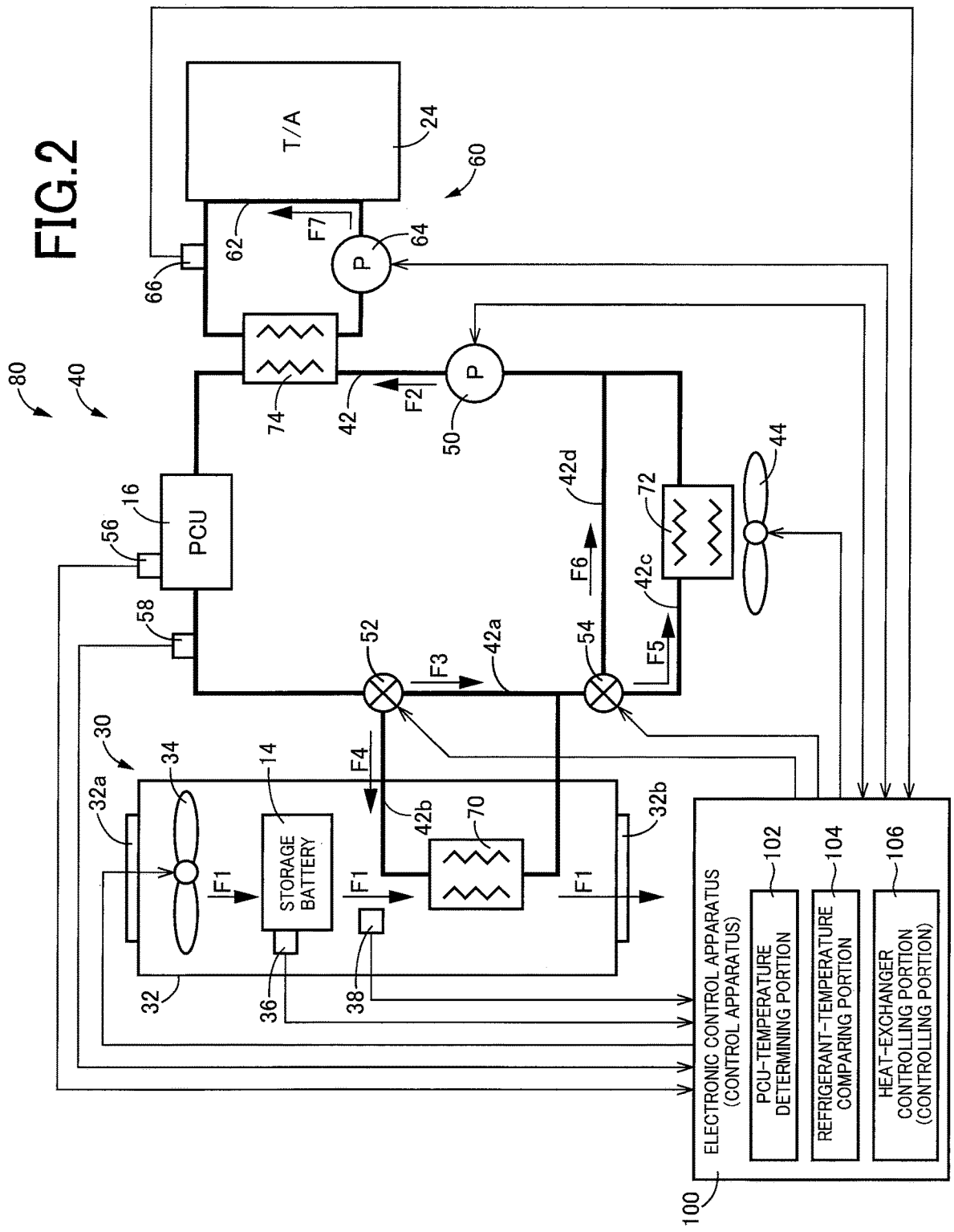
FIG. 2 is a functional block diagram for explaining constructions of respective cooling units of the cooling apparatus that is to be installed on the vehicle of FIG. 1, and also main parts of a control system of an electronic control apparatus for controlling the cooling units.

FIG. 2 is a functional block diagram for explaining constructions of respective cooling units of the cooling apparatus 80 that is to be installed on the vehicle 10, and also main parts of a control system of the electronic control apparatus 100 for controlling the cooling units.

There will be described the constructions of the respective cooling units of the cooling apparatus 80, with reference to FIG. 2. The cooling apparatus 80 includes a storage-battery cooling unit 30 for cooling the storage battery 14, a PCU cooling unit 40 for cooling the PCU 16 and a T/A cooling unit 60 for cooling the drive-force transmitting apparatus 24.

The storage-battery cooling unit 30 includes a casing 32, a fan 34, the above-described storage-battery temperature sensor 36 and an air temperature sensor 38. The fan 34, storage-battery temperature sensor 36 and air temperature sensor 38 as well as the storage battery 14 and a first heat exchanger 70 (that will be described later) are stored in the casing 32. The casing 32 has an inlet port 32a and an outlet port 32b that are provided in respective opposite end portions of the casing 32. The fan 34 is provided in a position which is inside the casing 32 and which is between the storage battery 14 and the inlet port 32a, so as to introduce an air through the inlet port 32a from outside the casing 32 and deliver the air to the storage battery 14. The storage-battery temperature sensor 36 is provided integrally in the storage battery 14, so as to detect the storage battery temperature Tbat. The air temperature sensor 38 is provided between the storage battery 14 and the first heat exchanger 70, so as to detect an air temperature Tair (° C.) after the storage battery 14 is cooled. When the fan 34 is operated in accordance with the control command signal supplied from the electronic control apparatus 100, the air introduced through the inlet port 32a is caused to flow as indicated by arrows F1, whereby the storage battery 14 is cooled by the air and the heat generated by the storage battery 14 is discharged together with the air through the outlet port 32b. The air introduced through the inlet port 32a constitutes a refrigerant of the storage-battery cooling unit 30.

The PCU cooling unit 40 includes a flow passage 42 (through which a liquid refrigerant is to flow to the PCU 16), a first heat exchanger 70, a second heat exchanger 72, a third heat exchanger 74, an LLC electric pump 50, a fan 44, a PCU temperature sensor 56 and an LLC temperature sensor 58. It is noted that the LLC electric pump 50 and the third heat exchanger 74 correspond to "second pump" and "heat exchanger", respectively, which are recited in the appended claims.

The liquid refrigerant of the PCU cooling unit 40 is an LLC (long life coolant) that is a coolant water containing additives such as ethylene glycol. Hereinafter, this coolant water will be referred to as "refrigerant LLC". Each of the first, second and third heat exchangers 70, 72, 74 is a device configured to transfer heat between fluids (e.g., refrigerants) which have respective temperatures different from each other and which are in contact with each other either directly or indirectly, or between a fluid and a solid which have respective temperatures different from each other and which are in contact with each other either directly or indirectly, such that the heat is transferred from one of the fluids (or the fluid and the solid) having a higher temperature to the other having a lower temperature.

The flow passage 42 is branched into first and second branch passages 42a, 42b in its first branch portion, such that the refrigerant LLC is allowed to flow through a selected one of the first and second branch passages 42a, 42b, which is selected by a first switching valve 52 provided in the first branch portion. The first and second branch passages 42a, 42b join each other in a first junction portion of the flow passage 42, which is located in a front side (i.e., downstream-side) of the above-described first branch portion in a direction of flow of the refrigerant LLC. Further, the flow passage 42 is branched into third and fourth branch passages 42c, 42d in its second branch portion that is located in a front side (i.e., downstream-side) of the above-described first junction portion in the direction of flow of the refrigerant LLC, such that the refrigerant LLC is allowed to flow through a selected one of the third and fourth branch passages 42c, 42d, which is selected by a second switching valve 54 provided in the second branch portion. The third and fourth branch passages 42c, 42d join each other in a second junction portion of the flow passage 42, which is located in a front side (i.e., downstream-side) of the above-described second branch portion in the direction of flow of the refrigerant LLC. Each of the first and second switching valves 52, 54 is, for example, a solenoid valve, and its switching operation is controlled in accordance with the control command signal supplied from the electronic control apparatus 100.

The refrigerant LLC, which is supplied to the flow passage 42 by the LLC electric pump 50, cools the PCU 16, and is then caused to flow through a selected one of the first and second branch passages 42a, 42b, as indicated by arrows F3, F4, which is selected by the first switching valve 52. When the refrigerant LLC is caused to flow through the second branch passage 42b, the heat is transferred between the refrigerant LLC of the PCU cooling unit 40 and the air that has cooled the storage battery 14, through the first heat exchanger 70 in which heat exchange is made.

For example, in a case in which the air temperature Tair of the air, which has cooled the storage battery 14, is higher than a LLC temperature Tllc (° C.) that is a temperature of the refrigerant LLC flowing through the second branch passage 42b, the refrigerant LLC is heated. In this case, the heat is transferred through the third heat exchanger 74 from the heated refrigerant LLC of the PCU cooling unit 40 to a liquid refrigerant ATF (Automatic Transmission Fluid) of the T/A cooling unit 60, whereby the refrigerant ATF is heated.

Further, in another case in which the air temperature Tair of the air, which has cooled the storage battery 14, is lower than the LLC temperature Tllc (° C.) that is the temperature of the refrigerant LLC flowing through the second branch passage 42b, the refrigerant LLC is cooled. In this case, the cooled refrigerant LLC is used to cool the PCU 16, when reaching the PCU 16. It is noted that the refrigerant LLC of the PCU cooling unit 40 and the LLC temperature Tllc of the refrigerant LLC correspond to "refrigerant of the PCU cooling unit" and "temperature of the refrigerant of the PCU cooling unit", respectively, which are recited in the appended claims.

The refrigerant LLC, which has been caused to flow through the first branch passage 42a or the second branch passage 42b, is caused to flow through a selected one of the third branch passage 42c and the fourth branch passage 42d, which is selected by the second switching valve 54, as indicated arrow F5 or arrow F6. In a case in which the refrigerant LLC is caused to flow through the third branch passage 42c, the refrigerant LLC is cooled by the second heat exchanger 72. Specifically, in the second heat exchanger 72, the refrigerant LLC is cooled with the heat being transferred between the refrigerant LLC and the air blasted by the fan 44. The refrigerant LLC, which has been caused to flow through the third branch passage 42c or the fourth branch passage 42d, is caused to flow to the third heat exchanger 74 by the LLC electric pump 50.

The third heat exchanger 74 is configured to transfer heat between the PCU cooling unit 40 and the T/A cooling unit 60. That is, in the third heat exchanger 74, the heat is transferred between the refrigerant LLC of the PCU cooling unit 40 and the refrigerant ATF of the T/A cooling unit 60. The refrigerant LLC, which has passed through the third heat exchanger 74, is returned to the PCU 16.

The PCU temperature sensor 56 is provided integrally in the PCU 16 so as to detect the PCU temperature Tpcu. The LLC temperature sensor 58 is provided to detect the LLC temperature Tllc of the refrigerant LLC that has cooled the PCU 16, and is disposed between the PCU 16 and the second heat exchanger 72 in the direction of flow of the refrigerant LLC, more preferably, is disposed in a portion of the flow passage 42 between the PCU 16 and the first switching valve 52. The fan 44, the first and second switching valves 52, 54 and the LLC electric pump 50 are operated in accordance with the control command signals supplied from the electronic control apparatus 100. For example, when the fan 44 and the LLC electric pump 50 are both operated and the refrigerant LLC is allowed by the second switching valve 54 to flow through the third branch passage 42c, the refrigerant LLC is circulated in the flow passage 42 in the PCU cooling unit 40 whereby the PCU 16 is cooled. It is noted that the LLC electric pump 50 has a rotational speed sensor (not shown) that is built in the LLC electric pump 50 and that an LLC-pump rotational speed Neop2 of the LLC electric pump 50 detected by the rotational speed sensor is inputted to the electronic control apparatus 100.

The T/A cooling unit 60 includes a flow passage 62 through which the refrigerant ATF is to flow to the drive-force transmitting apparatus 24, an ATF electric pump 64 and an ATF temperature sensor 66. As indicated by arrow F7, the refrigerant ATF, which is supplied to the flow passage 62 by the ATF electric pump 64, cools the first and second electric motor MG1, MG2 and other elements disposed in the drive-force transmitting apparatus 24. After the drive-force transmitting apparatus 24 has been cooled, the heat is transferred between the T/A cooling unit 60 and the PCU cooling unit 40 through the third heat exchanger 74 in which heat exchange is made. After having passed through the third heat exchanger 74, the refrigerant ATF is returned to the drive-force transmitting apparatus 24 by the ATF electric pump 64. The refrigerant ATF of the T/A cooling unit 60 is, for example, a chemical synthetic oil, and serves to cool the first and second electric motors MG1, MG2, drive-force distributing mechanism 18, speed reducer 20, differential device 25 and other elements provided in the drive-force transmitting apparatus 24 and also lubricate these elements provided in the drive-force transmitting apparatus 24. It is noted that the ATF electric pump 64 corresponds to "first pump" recited in the appended claims.

The ATF temperature sensor 66 is disposed in a portion of the flow passage 62 between the drive-force transmitting apparatus 24 and the third heat exchanger 74, so as to detect the ATF temperature Tatf (° C.) of the refrigerant ATF that has cooled the drive-force transmitting apparatus 24. It is noted that the refrigerant ATF of the T/A cooling unit 60 and the ATF temperature Tatf of refrigerant ATF correspond to "refrigerant of the T/A cooling unit" and "temperature of the refrigerant of the T/A cooling unit", respectively, which are recited in the appended claims.

For example, when the LLC electric pump 50, the ATF electric pump 64 and the fan 44 are operated and the refrigerant LLC is allowed by the second switching valve 54 to flow through the third branch passage 42c, the refrigerant ATF is circulated in the flow passage 62 of the T/A cooling unit 60 and the refrigerant LLC is circulated in the flow passage 42 of the PCU cooling unit 40, whereby the drive-force transmitting apparatus 24 is cooled. Specifically, the heat is transferred from the drive-force transmitting apparatus 24 is transferred to the refrigerant ATF of the T/A cooling unit 60, and is then transferred from the refrigerant ATF to the refrigerant LLC of the PCU cooling unit 40 through the third heat exchanger 74 in which the heat exchange is made. Further, with the heat is transferred from the refrigerant LLC to the air blown by the fan 44 in the second heat exchanger 72, the drive-force transmitting apparatus 24 is cooled. It is noted that the ATF electric pump 64 has a rotational speed sensor (not shown) that is built in the ATF electric pump 64 and that an ATF-pump rotational speed Neop1 of the ATF electric pump 64 detected by the rotational speed sensor is inputted to the electronic control apparatus 100.

As described above, the refrigerant of the PCU cooling unit 40 is the refrigerant LLC flowing through the flow passage 42, while the refrigerant of the T/A cooling unit 60 is the refrigerant ATF flowing through the flow passage 62. The third heat exchanger 74 makes it possible to the heat transfer between the refrigerant LLC of the PCU cooling unit 40 and the refrigerant ATF of the T/A cooling unit 60 through the third heat exchanger 74, without the refrigerant LLC of the PCU cooling unit 40 and the refrigerant ATF of the T/A cooling unit 60 being mixed with each other. That is, the heat can be transferred between the PCU 16 and the drive-force transmitting apparatus 24 through the refrigerant LLC of the PCU cooling unit 40, the third heat exchanger 74 and the refrigerant ATF of the T/A cooling unit 60. It is noted that the third heat exchanger 74 corresponds to "heat exchanger (for transferring heat between the PCU cooling unit and the T/A cooling unit)" that is recited in the appended claims.

There will be described main parts of a control system of the electronic control apparatus 100 configured to control the cooling units of the cooling apparatus 80, with reference to FIG. 2. The electronic control apparatus 100 functionally includes a PCU-temperature determining portion 102, a refrigerant-temperature comparing portion 104 and a heat-exchanger controlling portion 106 that cooperate to execute a cooling control in a case in which the external power supply is being performed during stop of the vehicle 10 with a predetermined condition being satisfied and/or in a case in which the vehicle 10 is running with the predetermined condition being satisfied. It is noted that the heat-exchanger controlling portion 106 corresponds to "controlling portion" recited in the appended claims.

In the case in which the external power supply is being performed with the vehicle 10 being stopped, the PCU temperature Tpcu is increased by the heat generated by the PCU 16, and the PCU temperature Tpcu is increased to a high temperature value when the external power supply is continued for a long time. Further, during the external power supply, the first and second electric motors MG1, MG2 in the drive-force transmitting apparatus 24 are not driven and rotary elements such as gears constituting a gear mechanism in the drive-force transmitting apparatus 24 are not rotated, so that the PCU temperature Tpcu of the PCU 16 is made higher than the temperature of the drive-force transmitting apparatus 24.

Therefore, during the external power supply, when the predetermined condition (that is described below) is satisfied, the cooling control is executed to cool the PCU 16 by transferring the heat from the PCU 16 to the drive-force transmitting apparatus 24 through the third heat exchanger 74. Specifically, the heat is transferred from the PCU 16 to the refrigerant LLC of the PCU cooling unit 40, and is then transferred from the refrigerant LLC to the refrigerant ATF of the T/A cooling unit 60 through the third heat exchanger 74. After the heat has been transferred to the refrigerant ATF, the heat is transferred from the refrigerant ATF to the drive-force transmitting apparatus 24 through the T/A cooling unit 60 whereby the PCU 16 is cooled.

Further, there is a case in which the load applied to the PCU 16 is increased by use of an auxiliary equipment (such as an air conditioner) during running of the vehicle 10 with the load applied to the first and second electric motors MG1, MG2 being small, for example, in a steady state at a relative low speed. In this case, the PCU temperature Tpcu is increased to a high temperature value and the PCU temperature Tpcu of the PCU 16 is made higher than the temperature of the drive-force transmitting apparatus 24. In this case, too, when the predetermined condition (that is described below) is satisfied, the cooling control is executed to cool the PCU 16 by transferring the heat from the PCU 16 to the drive-force transmitting apparatus 24 through the third heat exchanger 74.

In execution of the cooling control, the LLC electric pump 50 and the ATF electric pump 64 are driven with the LLC-pump rotational speed Neop2 of the LLC electric pump 50 and the ATF-pump rotational speed Neop1 of the ATF electric pump 64 being controlled, whereby the refrigerant LLC and the refrigerant ATF are circulated in the flow passage 42 of the PCU cooling unit 40 and the flow passage 62 of the T/A cooling unit 60, respectively, as needed. Thus, the heat generated in the PCU 16 is transferred toward the drive-force transmitting apparatus 24 through the PCU cooling unit 40 and the third heat exchanger 74, so that the PCU 16 is cooled. The LLC-pump rotational speed Neop2 of the LLC electric pump 50 and the ATF-pump rotational speed Neop1 of the ATF electric pump 64 are controlled in manners that will be described later. Further, when the refrigerant LLC is allowed to flow through the third branch passage 42c by the second switching valve 54 and the fan 44 is operated, the heat of refrigerant LLC of the PCU cooling unit 40 is dissipated through the second heat exchanger 72. Further, when the air temperature Tair of the air that has cooled the storage battery 14 is lower than the LLC temperature Tllc, the refrigerant LLC is allowed by the first switching valve 52 to flow through the second branch passage 42b, whereby the heat of the refrigerant LLC of the PCU cooling unit 40 is dissipated through the first heat exchanger 70.

The PCU-temperature determining portion 102 and the refrigerant-temperature comparing portion 104 of the electronic control apparatus 100 cooperate to determine whether the above-described predetermined condition required to execute the cooling control is satisfied or not. The PCU-temperature determining portion 102 is configured to determine whether the PCU temperature Tpcu detected by the PCU temperature sensor 56 is higher than a predetermined threshold temperature value Tthr_pcu. The threshold temperature value Tthr_pcu is determined through experimentation or determined by an appropriate design theory, and relates to the predetermined condition required to execute the cooling control to transfer the heat from the PCU 16 to the drive-force transmitting apparatus 24 through the third heat exchanger 74. The threshold temperature value Tthr_pcu is set to, for example, a certain temperature value such that the PCU temperature Tpcu of the PCU 16 is estimated to be increased to an upper limit value within a tolerable temperature range in a case in which the external power supply is performed or an increase of the load applied to the auxiliary equipment is continued for at least a given length of time after the PCU temperature Tpcu has reached to the certain temperature value as the threshold temperature value Tthr_pcu.

When the PCU-temperature determining portion 102 determines that the PCU temperature Tpcu is higher than the threshold temperature value Tthr_pcu, the refrigerant-temperature comparing portion 104 makes a determination as to whether the LLC temperature Tllc as the refrigerant temperature of the PCU cooling unit 40 is higher than the ATF temperature Tatf as the refrigerant temperature of the T/A cooling unit 60. This determination is made based on the LLC temperature Tllc detected by the LLC temperature sensor 58 and the ATF temperature Tatf detected by the ATF temperature sensor 66.

When the refrigerant-temperature comparing portion 104 determines that the LLC temperature Tllc is higher than the ATF temperature Tatf, it is determined that the predetermined condition required to execute the cooling control is satisfied. In this instance, the heat-exchanger controlling portion 106 causes the ATF electric pump 64 to be driven so as to cause the refrigerant ATF is circulated in the T/A cooling unit 60. Further, the heat-exchanger controlling portion 106 causes the LLC electric pump 50 also to be driven. Thus, the heat is transferred from the PCU cooling unit 40 to the T/A cooling unit 60 through the third heat exchanger 74 in which the heat exchange is made.

When the refrigerant-temperature comparing portion 104 determines that the ATF temperature Tatf is higher than the LLC temperature Tllc, the heat-exchanger controlling portion 106 stops the circulation of the refrigerant ATF, by not causing the ATF electric pump 64 to be driven. Thus, the heat transfer between the PCU cooling unit 40 and the T/A cooling unit 60 through the third heat exchanger 74 is restrained. The reason why the heat transfer through the third heat exchanger 74 is restrained is that, if the heat transfer through the third heat exchanger 74 is made when the ATF temperature Tatf is higher than the LLC temperature Tllc, the heat is transferred from the T/A cooling unit 60 to the PCU cooling unit 40 thereby consequently causing a risk that the PCU temperature Tpcu of the PCU 16 could be further increased.

Further, when the PCU-temperature determining portion 102 determines that the PCU temperature Tpcu of the PCU 16 is not higher than the threshold temperature value Tthr_pcu, the heat-exchanger controlling portion 106 restrains the heat transfer between the PCU cooling unit 40 and the T/A cooling unit 60 through the third heat exchanger 74, by not causing the ATF electric pump 64 to be driven. The reason why the heat transfer through the third heat exchanger 74 is retrained is that the PCU 16 does not need to be cooled by transferring the heat toward the T/A cooling unit 60 through the third heat exchanger 74 since the PCU temperature Tpcu is not higher than the threshold temperature value Tthr_pcu. Thus, the ATF electric pump 64 is not driven so that it is possible to restrain a consumption of the electric power by driving the ATF electric pump 64.

As described above, the heat-exchanger controlling portion 106 is configured, when it is determined that the PCU temperature Tpcu is higher than the threshold temperature value Tthr_pcu and that the ATF temperature Tatf is lower than the LLC temperature Tllc, to drive the ATF electric pump 64 and the LLC electric pump 50. In this instance, the heat-exchanger controlling portion 106 is configured to adjust or change the ATF-pump rotational speed Neop1 that corresponds to a rate of discharge of the ATF electric pump 64 for circulating the refrigerant ATF of the T/A cooling unit 60, depending on the LLC temperature Tllc of the refrigerant LLC of the PCU cooling unit 40 and the ATF temperature Tatf of the refrigerant ATF of the T/A cooling unit 60.

Figure 3:
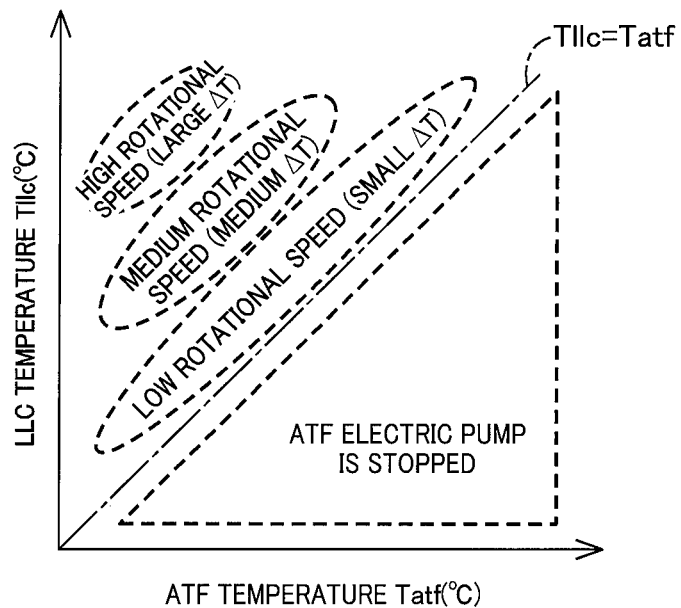
FIG. 3 is a relationship map for obtaining a target pump rotational speed of an ATF electric pump, wherein the relationship map indicates a relationship between the target pump rotational speed and a combination of an LLC temperature and an ATF temperature.

FIG. 3 is a relationship map for obtaining a target pump rotational speed Neop1* of the ATF electric pump 64, wherein the relationship map indicates a relationship between the target pump rotational speed Neop1* and a combination of the LLC temperature Tllc and the ATF temperature Tatf. The heat-exchanger controlling portion 106 controls the ATF-pump rotational speed Neop1 of the ATF electric pump 64 to the target pump rotational speed Neop1* that is determined in accordance with the relationship indicated by the relationship map of FIG. 3.

In FIG. 3, the combination of the LLC temperature Tllc and the ATF temperature Tatf lies on one-dot chain line when the LLC temperature Tllc and the ATF temperature Tatf are equal to each other. In a region located on a lower right side of the one-dot chain line, in which the ATF temperature Tatf is higher than the LLC temperature Tllc, the ATF electric pump 64 is stopped. If the ATF electric pump 64 were driven in this lower-right side region in which the ATF temperature Tatf is higher than the LLC temperature Tllc, the heat is transferred from the refrigerant ATF to the refrigerant LLC through the third heat exchanger 74, whereby the PCU 16 could be further heated. Therefore, the third heat exchanger 74 is stopped in the lower-right side region.

As shown in FIG. 3, in a region located on an upper left right side of the one-dot chain line, in which the ATF temperature Tatf is lower than the LLC temperature Tllc, the ATF electric pump 64 is driven. As shown in FIG. 3, the target pump rotational speed Neop1* of the ATF electric pump 64 is set to a low speed value in an area close to the one-dot chain line, and is increased with an increase of distance from the one-dot chain line to the combination of the LLC temperature Tllc and the ATF temperature Tatf. In the area close to the one-dot chain line, in which a temperature difference ΔT (=Tllc-Tatf) between the LLC temperature Tllc and the ATF temperature Tatf is small, even if the ATF-pump rotational speed Neop1 of the ATF electric pump 64 were made high so as to increase a rate of flow of the refrigerant ATF, a rate or amount of heat transfer would not remarkably changed as compared with a case in which the ATF-pump rotational speed Neop1 is kept low. Therefore, in the area close to the one-dot chain line, the target pump rotational speed Neop1* of the ATF electric pump 64 is set to the low speed value, whereby an amount of the electric power consumed by the ATF electric pump 64 is reduced.

Further, as shown in FIG. 3, in an area distant from the one-dot chain line, in which the temperature difference ΔT between the LLC temperature Tllc and the ATF temperature Tatf is large, the rate or amount of heat transfer is increased with an increase of the ATF-pump rotational speed Neop1 of the ATF electric pump 64. Therefore, the target pump rotational speed Neop1* of the ATF electric pump 64 is set to a speed value that is increased with an increase of the temperature difference ΔT between the LLC temperature Tllc and the ATF temperature Tatf. Therefore, the heat-exchanger controlling portion 106 controls the ATF-pump rotational speed Neop1 of the ATF electric pump 64 such that the ATF-pump rotational speed Neop1 is increased with the increase of the temperature difference ΔT between the LLC temperature Tllc and the ATF temperature Tatf. Consequently, as the temperature difference ΔT is increased, the amount of heat transfer through the third heat exchanger 74 is increased whereby the PCU 16 is cooled at an increased efficiency.

Further, the heat-exchanger controlling portion 106 adjusts or changes the LLC-pump rotational speed Neop2 that corresponds to a rate of discharge of the LLC electric pump 50 for circulating the refrigerant LLC of the PCU cooling unit 40, depending on the ATF-pump rotational speed Neop1 of the ATF electric pump 64.

Figure 4:
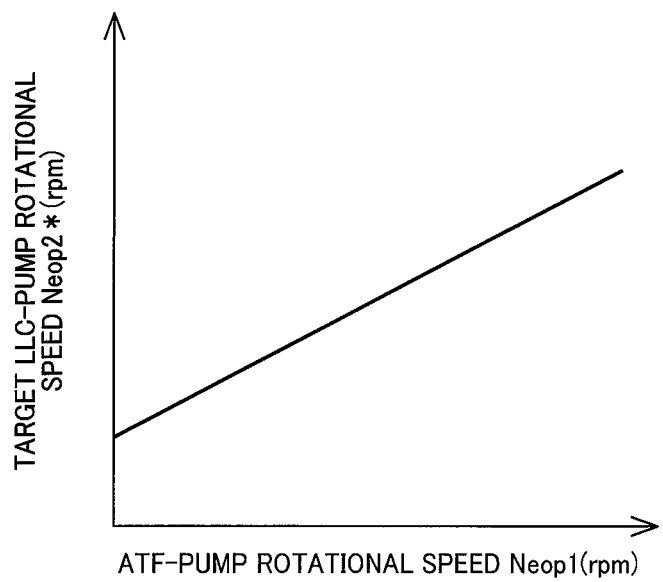
FIG. 4 is a relationship map for obtaining a target pump rotational speed of an LLC electric pump, based on a rotational speed of the ATF electric pump, wherein the relationship map indicates a relationship between the rotational speed of the ATF electric pump and the target pump rotational speed of the LLC electric pump.

FIG. 4 is a relationship map for obtaining a target pump rotational speed Neop2* that is a target speed value of the LLC-pump rotational speed Neop2 of the LLC electric pump 50, based on the ATF-pump rotational speed Neop1 of the ATF electric pump 64, wherein the relationship map indicates a relationship between the ATF-pump rotational speed Neop1 and the target pump rotational speed Neop2*. The heat-exchanger controlling portion 106 controls the LLC-pump rotational speed Neop2 of the LLC electric pump 50 to its target speed value, i.e., the target pump rotational speed Neop2* that is determined in accordance with the relationship indicated by the relationship map of FIG. 4.

As shown in the relationship map of FIG. 4, the target pump rotational speed Neop2* of the LLC electric pump 50 is set to a speed value that is increased with an increase of the ATF-pump rotational speed Neop1. For example, when the ATF-pump rotational speed Neop1 is low, namely, when the refrigerant ATF of the T/A cooling unit 60 is not circulated much, even if the LLC-pump rotational speed Neop2 of the LLC electric pump 50 were made high, the rate or amount of heat transfer through the third heat exchanger 74 would not be remarkably changed as compared with a case in which the LLC-pump rotational speed Neop2 is kept low. Therefore, when the ATF-pump rotational speed Neop1 is low, the target pump rotational speed Neop2* of the LLC electric pump 50 is set to the low speed value, whereby an amount of the electric power consumed by the LLC electric pump 50 is reduced.

Further, when the ATF-pump rotational speed Neop1 becomes high, the target pump rotational speed Neop2* of the LLC electric pump 50 is increased, by taking account that the refrigerant ATF is actively circulated in the T/A cooling unit 60 with the increase of the ATF-pump rotational speed Neop1. Thus, the heat-exchanger controlling portion 106 controls the LLC-pump rotational speed Neop2 of the LLC electric pump 50 such that the LLC-pump rotational speed Neop2 is increased with the increase of the ATF-pump rotational speed Neop1. With the LLC-pump rotational speed Neop2 being controlled as described above, the refrigerant LLC of the PCU cooling unit 40 is more actively circulated with the increase of the ATF-pump rotational speed Neop1, whereby a heat transfer coefficient of the third heat exchanger 74 is increased with the increase of the ATF-pump rotational speed Neop1. Therefore, the PCU 16 is efficiently cooled with the increase of the rate or amount of heat transfer through the third heat exchanger 74.

Figure 5:
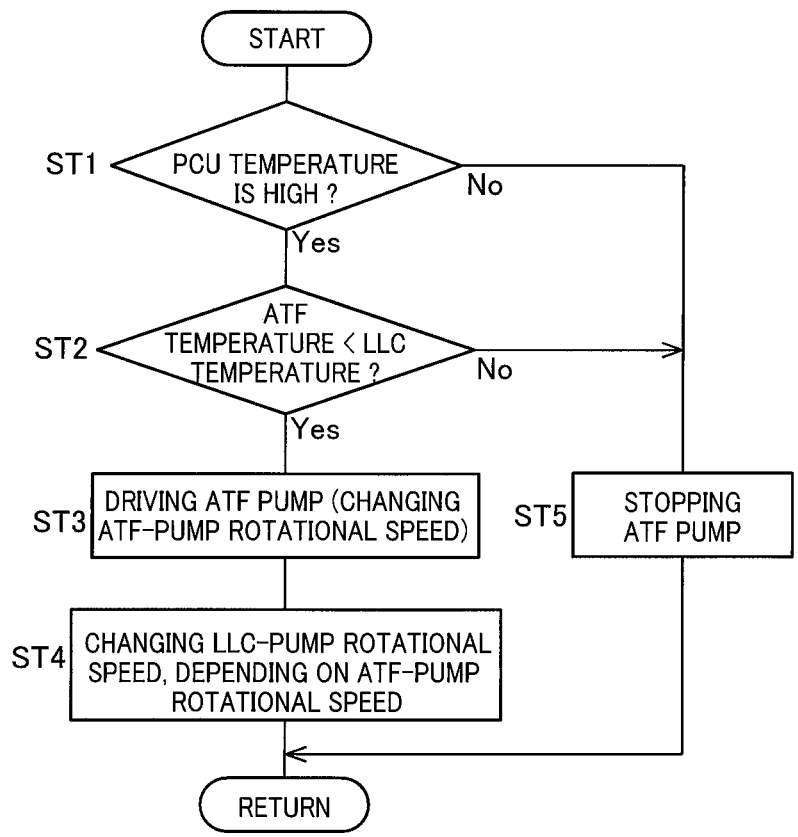
FIG. 5 is a flow chart showing a control routine executed by the electronic control apparatus shown in FIG. 2.

FIG. 5 is a flow chart showing a control routine executed by the electronic control apparatus 100 shown in FIG. 2. This control routine is executed in a repeated manner during the external power supply performed by the vehicle 10 and during running of the vehicle 10.

The control routine shown by the flow chart of FIG. 5 is initiated with step ST1 corresponding to control function of the PCU-temperature determining portion 102, which is implemented to determine whether the PCU temperature Tpcu is higher than the threshold temperature value Tthr_pcu. When a negative determination is made at step ST1, the control flow goes to step ST5. When an affirmative determination is made at step ST1, step ST2 corresponding to control function of the refrigerant-temperature comparing portion 104 is implemented to determine whether the LLC temperature Tllc is higher than the ATF temperature Tatf. When a negative determination is made at step ST2, the control flow goes to step ST5.

When an affirmative determination is made at step ST2, step ST3 corresponding to control function of the heat-exchanger controlling portion 106 is implemented to drive the ATF electric pump 64. At this step ST3, the target pump rotational speed Neop1* of the ATF electric pump 64 is adjusted or changed in accordance with the relationship between the target pump rotational speed Neop1* and the combination of the LLC temperature Tllc and the ATF temperature Tatf, which is shown in the relation map of FIG. 3, and the ATF-pump rotational speed Neop1 is controlled to the adjusted or changed target pump rotational speed Neop1*.

Step ST3 is followed by step ST4 corresponding to control function of the heat-exchanger controlling portion 106, which is implemented to adjust or change the LLC-pump rotational speed Neop2 of the LLC electric pump 50, depending on the ATF-pump rotational speed Neop1 of the ATF electric pump 64. Specifically, with the ATF-pump rotational speed Neop1 being applied in the relationship map of FIG. 4, the target pump rotational speed Neop2* of the LLC electric pump 50 is determined, and the LLC-pump rotational speed Neop2 of the LLC electric pump 50 is controlled to the determined target pump rotational speed Neop2*. Thus, the LLC-pump rotational speed Neop2 of the LLC electric pump 50 is rotated at a suitable speed that is dependent on the ATF-pump rotational speed Neop1 of the ATF electric pump 64, whereby the heat transfer coefficient of the third heat exchanger 74 is increased whereby the heat generated in the PCU 16 is efficiently transferred toward the drive-force transmitting apparatus 24 through the third heat exchanger 74. That is, the PCU 16 is efficiently cooled.

When a negative determination is made at step ST1 or at step ST2, the control flow goes to step ST5 corresponding to control function of the heat-exchanger controlling portion 106, which is implemented to stop driving the ATF electric pump 64. A this step ST5, for example, when the PCU temperature Tpcu is higher than the threshold temperature value Tthr_pcu, the LLC electric pump 50 is driven and the second switching valve 54 is controlled to allow the refrigerant LLC to flow through the third branch passage 42c, so that the refrigerant LLC is circulated in the PCU cooling unit 40 and is cooled by the fan 44. Consequently, the PCU 16 is cooled.

As described above, in the present embodiment, when the PCU temperature Tpcu of the PCU 16 is higher than the threshold temperature value Tthr_pcu and also the LLC temperature Tllc of the refrigerant LLC of the PCU cooling unit 40 is higher than the ATF temperature Tatf of the refrigerant ATF of the T/A cooling unit 60, the ATF electric pump 64 is driven for circulating the refrigerant ATF of the T/A cooling unit 60. In this instance, the heat is transferred between the PCU cooling unit 40 and the T/A cooling unit 60 through the third heat exchanger 74, so that the heat generated in the PCU 16 is transferred toward the drive-force transmitting apparatus 24 whereby the PCU 16 is cooled. Further, when the PCU temperature Tpcu of the PCU 16 becomes lower than the threshold temperature value Tthr_pcu, even if the LLC temperature Tllc of the refrigerant LLC of the PCU cooling unit 40 is higher than the ATF temperature Tatf of the refrigerant ATF of the T/A cooling unit 60, the ATF electric pump 64 is not driven so that it is possible to improve the cooling efficiency by avoiding an unnecessary drive of the pump.

In the present embodiment, the ATF-pump rotational speed Neop1 of the ATF electric pump 64 is increased with the increase of the temperature difference ΔT between the LLC temperature Tllc of the refrigerant LLC of the PCU cooling unit 40 and the ATF temperature Tatf of the refrigerant ATF of the T/A cooling unit 60. Thus, the ATF electric pump 64 is efficiently driven whereby the cooling efficiency of the cooling apparatus 80 is improved. Further, the LLC-pump rotational speed Neop2 of the LLC electric pump 50 is increased with the increase of the ATF-pump rotational speed Neop1 of the ATF electric pump 64. Thus, the heat transfer coefficient between the refrigerant LLC of the PCU cooling unit 40 and the third heat exchanger 74 is increased with the increase of the ATF-pump rotational speed Neop1 of the ATF electric pump 64, thereby making it possible to efficiently transfer the heat generated in the PCU 16, toward the drive-force transmitting apparatus 24. Therefore, the cooling efficiency of the cooling apparatus 80 is further improved.

While the preferred embodiment of this invention has been described in detail by reference to the drawings, it is to be understood that the invention may be otherwise embodied.

For example, in the above-described embodiment, the vehicle 10 is a hybrid vehicle having drive force sources in the form of the engine 12 and the second electric motor MG2. However, the present invention is applicable to other types of vehicles such as a series-hybrid vehicle, a plug-in-hybrid vehicle and an electric vehicle. That is, the present invention is applicable to any type of vehicle, as long as the vehicle includes a drive-force transmitting apparatus including an electric motor for driving the vehicle, a power control unit for controlling the electric motor, a PCU cooling unit for cooling the power control unit, a T/A cooling unit for cooling the drive-force transmitting apparatus and a heat exchanger for transferring heat between the PCU cooling unit and the T/A cooling unit.

In the above-described embodiment, the LLC-pump rotational speed Neop2 of the LLC electric pump 50 is adjusted or changed depending on the ATF-pump rotational speed Neop1 of the ATF electric pump 64. However, this control arrangement may be modified, for example, such that the LLC-pump rotational speed eop2 is set to a constant speed value, or such that the LLC-pump rotational speed Neop2 is adjusted or changed depending on the PCU temperature Tpcu of the PCU 16 and/or the LLC temperature Tllc of the refrigerant LLC of the PCU cooling unit 40.

In the above-described embodiment, the flow passage 42 is branched into third and fourth branch passages 42c, 42d, such that the refrigerant LLC is allowed to flow through a selected one of the third and fourth branch passages 42c, 42d, which is selected by the second switching valve 54. However, the fourth branch passage 42d may be omitted.

In the above-described embodiment, the cooling apparatus 80 includes the storage-battery cooling unit 30 for cooling the storage battery 14. However, in the present invention, the storage-battery cooling unit 30 is not essential, and the cooling apparatus 80 may not include the storage-battery cooling unit 30. Further, in the above-described embodiment, the first heat exchanger 70 is provided between the storage-battery cooling unit 30 and the PCU cooling unit 40. However, in the present invention, the first heat exchanger 70 is not essential, and the cooling apparatus 80 may not include the first heat exchanger 70.

In the above-described embodiment, the storage-battery cooling unit 30 is a cooling unit of air-cooling type in which the air introduced through the inlet port 32a is used as the refrigerant. However, the storage-battery cooling unit 30 does not necessarily have to be of air-cooling type, but may be of water-cooling type, for example.

In the above-described embodiment, the PCU cooling unit 40 is a cooling unit of water-cooling type in which the refrigerant LLC (that is a coolant water) is used as the refrigerant. However, the PCU cooling unit 40 does not necessarily have to be of water-cooling type, but may be of oil-cooling type in which an oil is used as the refrigerant, for example.

It is to be understood that the embodiment described above is given for illustrative purpose only, and that the present invention may be embodied with various modifications and improvements which may occur to those skilled in the art.

NOMENCLATURE OF ELEMENTS

10: vehicle
14: storage battery
16: power control unit
24: drive-force transmitting apparatus
40: PCU cooling unit
50: LLC electric pump (second pump)
60: T/A cooling unit
64: ATF electric pump (first pump)
74: third heat exchanger (heat exchanger)
80: vehicle cooling apparatus
100: electronic control apparatus (control apparatus)
106: heat-exchanger controlling portion (controlling portion)
MG2: second electric motor (electric motor for driving vehicle)
ATF: refrigerant of T/A cooling unit
LLC: refrigerant of PCU cooling unit
Tthr_pcu: threshold temperature value
Tatf: temperature of refrigerant of T/A cooling unit
Tllc: temperature of refrigerant of PCU cooling unit

What is claimed is:

1. A control apparatus for a cooling apparatus that is to be installed on a vehicle,
    wherein the vehicle includes (i) a drive-force transmitting apparatus including an electric motor for driving the vehicle, and (ii) a power control unit for controlling the electric motor,
    wherein the cooling apparatus includes:
    a PCU cooling unit for cooling the power control unit;
    a T/A cooling unit for cooling the drive-force transmitting apparatus; and
    a heat exchanger for transferring heat between the PCU cooling unit and the T/A cooling unit,
    wherein the T/A cooling unit includes a first pump for circulating a refrigerant of the T/A cooling unit, while the PCU cooling unit includes a second pump for circulating a refrigerant of the PCU cooling unit, wherein the control apparatus comprises a controlling portion configured to cause the first pump to be driven when a temperature of the power control unit is higher than a threshold temperature value and a temperature of the refrigerant of the PCU cooling unit is higher than a temperature of the refrigerant of the T/A cooling unit, and wherein the controlling portion is configured to change a rotational speed of the first pump, depending on the temperature of the refrigerant of the PCU cooling unit and the temperature of the refrigerant of the T/A cooling unit, such that the rotational speed of the first pump is increased with an increase of a difference between the temperature of the refrigerant of the PCU cooling unit and the temperature of the refrigerant of the T/A cooling unit.

2. The control apparatus according to claim 1, wherein the controlling portion is configured to change a rotational speed of the second pump, depending on the rotational speed of the first pump, such that the rotational speed of the second pump is increased with an increase of the rotational speed of the first pump.

3. The control apparatus according to claim 1, wherein the vehicle further includes a storage battery for supplying an electric power to the electric motor, and wherein the vehicle has a construction that allows the electric power to be supplied from the storage battery through the power control unit to an exterior of the vehicle.

4. A control apparatus for a cooling apparatus that is to be installed on a vehicle, wherein the vehicle includes (i) a drive-force transmitting apparatus including an electric motor for driving the vehicle, and (ii) a power control unit for controlling the electric motor, wherein the cooling apparatus includes:

a PCU cooling unit for cooling the power control unit;

a T/A cooling unit for cooling the drive-force transmitting apparatus; and a heat exchanger for transferring heat between the PCU cooling unit and the T/A cooling unit, wherein the T/A cooling unit includes a first pump for circulating a refrigerant of the T/A cooling unit, while the PCU cooling unit includes a second pump for circulating a refrigerant of the PCU cooling unit, wherein the control apparatus comprises a controlling portion configured to cause the first pump to be driven when a temperature of the power control unit is higher than a threshold temperature value and a temperature of the refrigerant of the PCU cooling unit is higher than a temperature of the refrigerant of the T/A cooling unit, wherein the control apparatus further comprises a PCU-temperature determining portion and a refrigerant-temperature comparing portion, wherein the PCU-temperature determining portion is configured to determine whether the temperature of the power control unit is higher than the threshold temperature value, and wherein the refrigerant-temperature comparing portion is configured to determine whether the temperature of the refrigerant of the PCU cooling unit is higher than the temperature of the refrigerant of the T/A cooling unit.

* * * * *